United States Patent
Kao et al.

(10) Patent No.: US 11,795,319 B2
(45) Date of Patent: Oct. 24, 2023

(54) SILICONE-MODIFIED DICYCLOPENTADIENE-DERIVED HYDROXY AROMATIC COMPOUND, MANUFACTURING METHOD THEREOF, AND CURABLE PRODUCT

(71) Applicant: Swancor Highpolymer Co., Ltd., Nantou (TW)

(72) Inventors: Jun-Qi Kao, Nantou (TW); Meng-Wei Wang, Nantou (TW)

(73) Assignee: Swancor Highpolymer Co., Ltd., Nantou (TW)

( * ) Notice: Subject to any disclaimer, the term of this patent is extended or adjusted under 35 U.S.C. 154(b) by 121 days.

(21) Appl. No.: 17/487,091

(22) Filed: Sep. 28, 2021

(65) Prior Publication Data

US 2022/0098399 A1    Mar. 31, 2022

Related U.S. Application Data

(60) Provisional application No. 63/084,013, filed on Sep. 28, 2020.

(51) Int. Cl.
*C08L 43/04* (2006.01)
*C08K 5/14* (2006.01)
*C08L 71/02* (2006.01)

(52) U.S. Cl.
CPC ............... *C08L 43/04* (2013.01); *C08K 5/14* (2013.01); *C08L 71/02* (2013.01)

(58) Field of Classification Search
CPC .......... C07C 395/00; C08F 20/14; C08F 4/42; C08L 43/04; C08L 71/02; C08K 5/14
See application file for complete search history.

(56) References Cited

FOREIGN PATENT DOCUMENTS

| TW | 166678 B | 8/1991 | |
|---|---|---|---|
| TW | 201219454 A | * 5/2012 | ............ C08L 83/06 |
| TW | 201219454 A | 5/2012 | |
| TW | 202017960 A | 5/2020 | |

\* cited by examiner

*Primary Examiner* — Robert D Harlan
(74) *Attorney, Agent, or Firm* — Joseph C. Zucchero; Carolyn S. Elmore; Elmore Patent Law Group, P.C.

(57) ABSTRACT

The present disclosure provides a silicone-modified dicyclopentadiene-derived hydroxy aromatic compound, which includes a structure represented by formula (I). Formula (I) is defined as in the specification. The present disclosure further provides a manufacturing method for a silicone-modified dicyclopentadiene-derived hydroxy aromatic compound and a curable product, wherein the curable product is obtained by mixing the silicone-modified dicyclopentadiene-derived hydroxy aromatic compound and a modified polyphenylene oxide resin, and then adding a peroxide to perform a curing reaction.

10 Claims, 1 Drawing Sheet

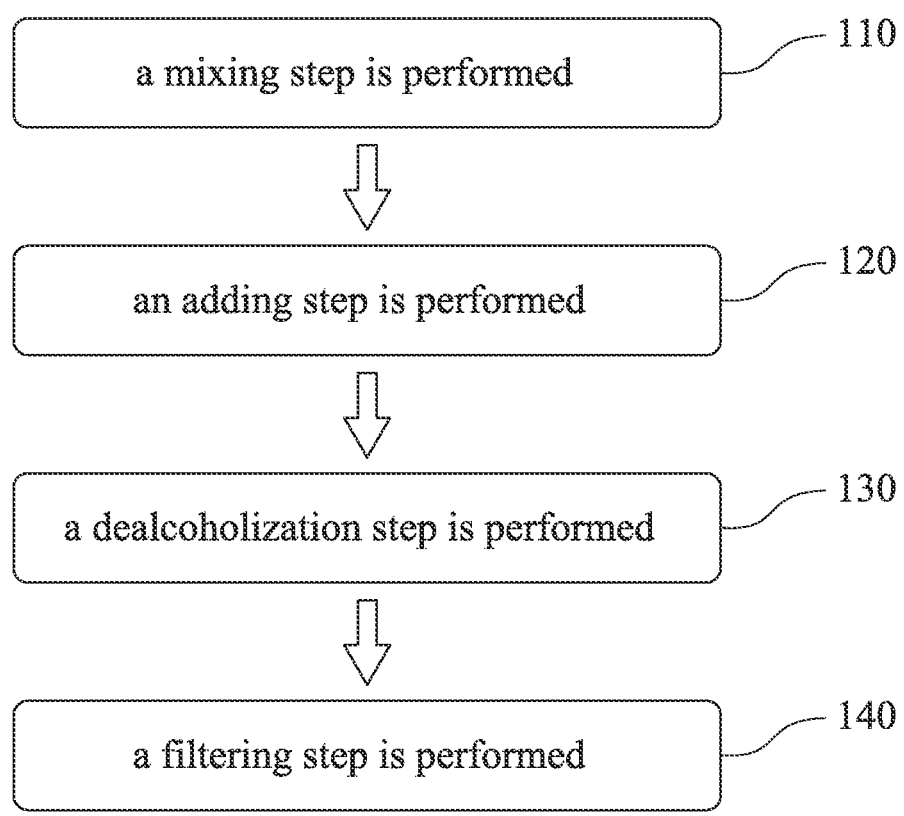

SILICONE-MODIFIED DICYCLOPENTADIENE-DERIVED HYDROXY AROMATIC COMPOUND, MANUFACTURING METHOD THEREOF, AND CURABLE PRODUCT

RELATED APPLICATIONS

This application claims priority to U.S. Provisional Application Ser. No. 63/084,013, filed Sep. 28, 2020, which is herein incorporated by reference.

BACKGROUND

Technical Field

The present disclosure relates to a silicone-modified resin, a manufacturing method thereof and a curable product. More particularly, the present disclosure relates to a silicone-modified dicyclopentadiene-derived hydroxy aromatic compound, a manufacturing method thereof and a curable product.

Description of Related Art

Nowadays, the electronic products have become lighter, thinner, shorter and smaller, and are suitable for high-frequency transmission. With the explosive increase in the amount of information in the recent years, the requirement of high-frequency printed circuit boards is getting higher and higher. In order to reduce transmission loss of high-frequency, the materials with excellent electrical properties have become the research focus in the related fields. At the same time, in order to maintain the normal operation of electronic components in the high temperature and the high humidity environment, the circuit board must have the characteristics of the heat resistance, the flame resistance and the low water absorption.

Currently, in the field of circuit boards, the epoxy resin cured with the phenolic resin is often used as the insulation and bonding materials. However, although this type materials have excellent processing characteristics and good adhesion with copper foil, they have the disadvantage of generating polar functional groups after curing, resulting in the electrical performance is reduced, and are not suitable for applying to high-frequency and high-speed circuit boards. In view of the above disadvantage, some technologies have been oriented to use epoxy resin with active ester and styrene-maleic anhydride copolymer (SMA) together to overcome the formation of highly polar groups after curing. Even if the electrical performance is improved, it used in the field of high-frequency and low loss is still slightly insufficient.

Therefore, how to synthesize a new type of resin which can be used in high-frequency and low loss applications is the goal of the relevant industry.

SUMMARY

According to one aspect of the present disclosure, a silicone-modified dicyclopentadiene-derived hydroxy aromatic compound is provided. The silicone-modified dicyclopentadiene-derived hydroxy aromatic compound includes a structure represented by formula (I):

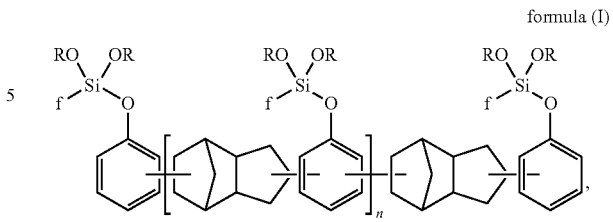

formula (I)

wherein R is a methyl group or an ethyl group, f is a vinyl group or a 3-(methacryloxy)propyl group, and n is an integer from 0 to 5.

According to another aspect of the present disclosure, a manufacturing method for a silicone-modified dicyclopentadiene-derived hydroxy aromatic compound includes steps as follows. A mixing step is performed, wherein a dicyclopentadiene-derived hydroxy aromatic compound represented by formula (i) is mixed with an anhydrous solvent, and then heated to a first temperature to dissolve acceleratedly to obtain a first mixture:

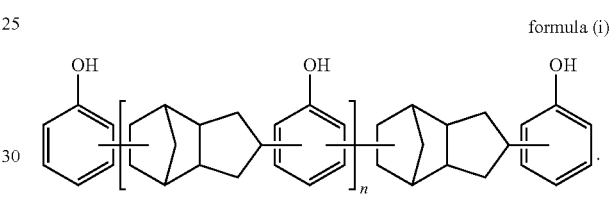

formula (i)

An adding step is performed, wherein a catalyst is added to the first mixture to obtain a second mixture. A dealcoholization step is performed, wherein the second mixture is heated to a second temperature, a siloxane compound represented by formula (ii) is added to the second mixture, and an alcohol is distilled out to obtain a third mixture:

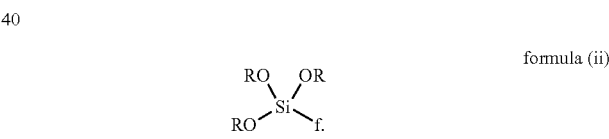

formula (ii)

A filtering step is performed, wherein the third mixture is cooled and filtered to obtain a silicone-modified dicyclopentadiene-derived hydroxy aromatic compound represented by formula (I):

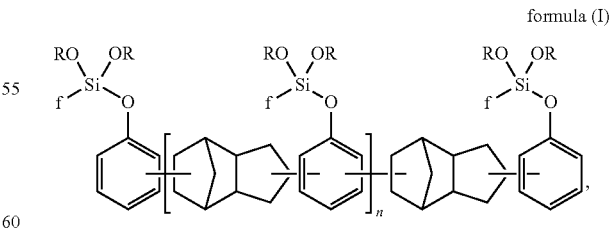

formula (I)

wherein R is a methyl group or an ethyl group, f is a vinyl group or a 3-(methacryloxy)propyl group, and n is an integer from 0 to 5.

According to further another aspect of the present disclosure, a curable product is provided. The curable product is obtained by mixing the silicone-modified dicyclopentadiene-derived hydroxy aromatic compound according to the aforementioned aspect and a modified polyphenylene oxide resin, and then adding a peroxide to perform a curing reaction.

BRIEF DESCRIPTION OF THE DRAWINGS

The present disclosure can be more fully understood by reading the following detailed description of the embodiment, with reference made to the accompanying drawings as follows:

FIG. 1 is a flow chart of a manufacturing method for a silicone-modified dicyclopentadiene-derived hydroxy aromatic compound according to one embodiment of the present disclosure.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the compound structure can be represented by a skeleton formula, and the representation can omit the carbon atom, the hydrogen atom and the carbon-hydrogen bond. In the case that the functional group is depicted clearly in the structural formula, the depicted one is preferred.

In the present disclosure, in order to concise and smooth, "silicone-modified dicyclopentadiene-derived hydroxy aromatic compound, comprising a structure represented by formula (I)" can be represented as a silicone-modified dicyclopentadiene-derived hydroxy aromatic compound represented by formula (I) or a silicone-modified dicyclopentadiene-derived hydroxy aromatic compound (I) in some cases, and the other compounds or groups can be represented in the same manner.

In the present disclosure, if it is not specifically specified whether a certain group is substituted, the group can represent a substituted or an unsubstituted group. For example, "alkyl group" can refer to a substituted or an unsubstituted alkyl.

A Silicone-Modified Dicyclopentadiene-Derived Hydroxy Aromatic Compound

A silicone-modified dicyclopentadiene-derived hydroxy aromatic compound is provided of the present disclosure, which includes a structure represented by formula (I):

formula (I)

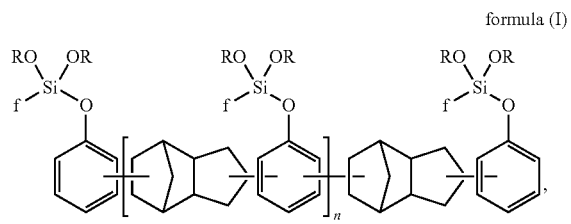

wherein R is a methyl group or an ethyl group, f is a vinyl group or a 3-(methacryloxy)propyl group, and n is an integer from 0 to 5.

Specifically, the carbon-oxygen bond energy is about 358 KJ/mol, and the silicon-oxygen bond energy is about 452 KJ/mol. Therefore, the siloxane material has the better heat resistance, as well as excellent dielectric property and low hygroscopicity at the same time. The present disclosure is using the siloxane compound as a bridge to introduce the functional group of free radical curing into the dicyclopentadiene-derived hydroxy aromatic compound with excellent dielectric property, while satisfying the characteristics of free radical curing that do not generate the polar functional groups and retaining the electrical property of siloxane compound and the excellent adhesion property to metal and fiber. Thus, it has great potential in the field of glass fiber prepreg and high-frequency low-loss substrate.

A Manufacturing Method for a Silicone-Modified Dicyclopentadiene-Derived Hydroxy Aromatic Compound Please refer to FIG. 1, which is a flow chart of a manufacturing method for a silicone-modified dicyclopentadiene-derived hydroxy aromatic compound 100 according to one embodiment of the present disclosure. In FIG. 1, the manufacturing method for the silicone-modified dicyclopentadiene-derived hydroxy aromatic compound 100 includes a step 110, a step 120, a step 130 and a step 140.

In the step 110, a mixing step is performed, wherein a dicyclopentadiene-derived hydroxy aromatic compound represented by formula (i) is mixed with an anhydrous solvent, and then heated to a first temperature to dissolve acceleratedly to obtain a first mixture:

formula (i)

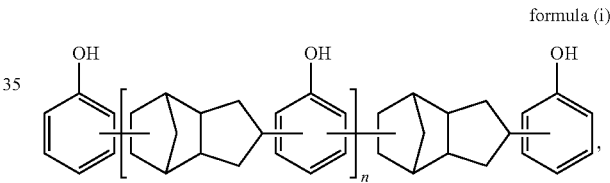

wherein n is an integer from 0 to 5. Specifically, the anhydrous solvent is preferably an aromatic, which can be but not limited to toluene or xylene, etc., and the first temperature can be 80° C. to 110° C.

In the step 120, an adding step is performed, wherein a catalyst is added to the first mixture to obtain a second mixture. Specifically, the catalyst is preferably an imidazole derivative, DBU type derivative or DMAP derivative, which can be but not limited to 1-alkylimidazole, 1-acetylimidazole, 1-benzylimidazole, 2-alkylimidazole, 2-ethyl-4-methylimidazole, 2,4-dimethylimidazole, 2-phenylimidazole, 1,8-diazabicyclo[5.4.0]undec-7-ene (DBU), 1,5-diazabicyclo[4.3.0]non-5-ene (DBN) and 4-dimethylaminopyridine (DMAP), and an addition amount of the catalyst can be 200 ppm to 1000 ppm.

In the step 130, a dealcoholization step is performed, wherein the second mixture is heated to a second temperature, a siloxane compound represented by formula (ii) is added to the second mixture, and an alcohol is distilled out to obtain a third mixture:

formula (ii)

wherein R is a methyl group or an ethyl group, f is a vinyl group or a 3-(methacryloxy)propyl group. Specifically, when R is the methyl group and f is the vinyl group, it has a structure represented by formula (ii-1), which is trimethoxyvinylsilane. Furthermore, when R is the methyl group and f is the 3-(methacryloxy)propyl group, it has a structure represented by formula (ii-2), which is 3-(methacryloxy)propyltrimethoxysilane:

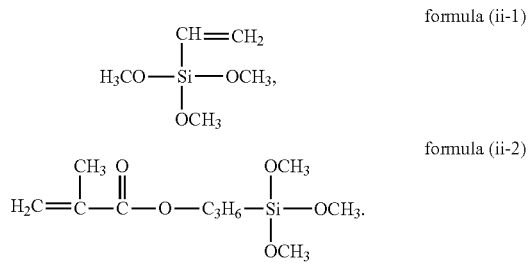

Specifically, after the temperature is raised to the second temperature, the siloxane compound represented by formula (ii) needs to be added within a certain time, and the large amount of alcohol is distilled out during the addition process, and maintained at the second temperature for 2 hours to 6 hours. The second temperature can be 110° C. to 120° C., and the certain time can be 30 minutes to 90 minutes.

In the step 140, a filtering step is performed, wherein the third mixture is cooled and filtered to obtain a silicone-modified dicyclopentadiene-derived hydroxy aromatic compound represented by formula (I):

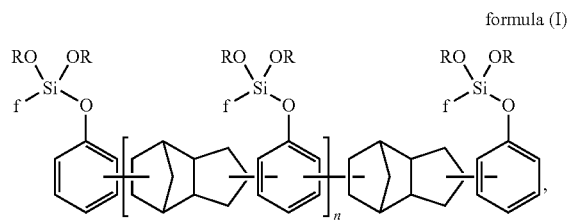

wherein R is a methyl group or an ethyl group, f is a vinyl group or a 3-(methacryloxy)propyl group, and n is an integer from 0 to 5.

Accordingly, the manufacturing method of the silicone-modified dicyclopentadiene-derived hydroxy aromatic compound of the present disclosure uses the aromatic solvent and the silicone compound with relatively low moisture sensitivity. The influence of moisture is relatively controllable, and the alcohol produced in the process can be distilled out through the production equipment with simple design to achieve the use without the special purification step, and provide the feasibility of the commercial mass production.

A Curable Product

A curable product is provided of the present disclosure, which is obtained by mixing the aforementioned silicone-modified dicyclopentadiene-derived hydroxy aromatic compound represented by formula (I) and a modified polyphenylene oxide resin, and then adding a peroxide to perform a curing reaction. Specifically, a solid content ratio of the silicone-modified dicyclopentadiene-derived hydroxy aromatic compound represented by formula (I) to the modified polyphenylene oxide resin can be 20:80, and the curing reaction can be performed by a staged heating method, and the modified polyphenylene oxide resin can be but not limited to a methacrylate based modified polyphenylene oxide.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

Synthesis Example

Synthesis Example 1: 340 parts by weight of the dicyclopentadiene-derived hydroxy aromatic compound (ERM-6410, purchased from Songwon, Korea) and 274 parts by weight of the toluene are placed in a reactor equipped with a stirrer, a feeding funnel, a thermometer and a gas pipe, and introducing the dry air to heat to 90° C. for 1 hour. Next, 0.85 parts by weight of the 2-ethyl-4-methylimidazole is added as a catalyst and heated to 110° C., then 234 parts by weight of the trimethoxyvinylsilane is slowly added dropwise for 60 minutes and the temperature is maintained at 110° C. for 2 hours. Finally, cooling to the room temperature and filtering to obtain the silicone-modified dicyclopentadiene-derived hydroxy aromatic compound of Synthesis Example 1.

Synthesis Example 2: 300 parts by weight of the dicyclopentadiene-derived hydroxy aromatic compound and 324 parts by weight of the xylene are placed in a reactor equipped with a stirrer, a feeding funnel, a thermometer and a gas pipe, and introducing the dry air to heat to 100° C. for 1 hour. Next, 0.75 parts by weight of the 4-dimethylaminopyridine is added as a catalyst and heated to 115° C., then 346 parts by weight of the 3-(methacryloxy)propyltrimethoxysilane is slowly added dropwise for 60 minutes and the temperature is maintained at 115° C. for 4 hours. Finally, cooling to the room temperature and filtering to obtain the silicone-modified dicyclopentadiene-derived hydroxy aromatic compound of Synthesis Example 2.

Example/Comparative Example

Example 1: 8 parts by weight of the methacrylate based modified polyphenylene oxide resin (SA9000, purchased from Sabic) and 3.1 parts by weight of Synthesis Example 1 (solid content is 65%) are mixed, and adding 0.1 parts by weight of dicumyl peroxide. Next, the appropriate amount of the butanone is added to adjust the appropriate viscosity, and taking the appropriate amount to pour into the aluminum plate. The film is formed by curing in the nitrogen oven, and the curing temperature is raised in stages to obtain the sheet-shaped curable product of Example 1.

Example 2: 8 parts by weight of the methacrylate based modified polyphenylene oxide resin and 3.3 parts by weight of Synthesis Example 2 (solid content is 60%) are mixed, and adding 0.1 parts by weight of dicumyl peroxide. Next, the appropriate amount of the butanone is added to adjust the appropriate viscosity, and taking the appropriate amount to pour into the aluminum plate. The film is formed by curing in the nitrogen oven, and the curing temperature is raised in stages to obtain the sheet-shaped curable product of Example 2.

Comparative Example 1: 10 parts by weight of the methacrylate based modified polyphenylene oxide resin is dissolved in toluene, and adding 0.1 parts by weight of dicumyl peroxide. Next, the appropriate amount of the butanone is added to adjust the appropriate viscosity, and taking the appropriate amount to pour into the aluminum plate. The film is formed by curing in the nitrogen oven, and the curing temperature is raised in stages to obtain the sheet-shaped curable product of Comparative Example 1.

Comparative Example 2: 10 parts by weight of the styrene based modified polyphenylene oxide resin (OPE-2St, purchased from Mitsubishi Gas) is dissolved in toluene, and adding 0.1 parts by weight of dicumyl peroxide. Next, the appropriate amount of the butanone is added to adjust the appropriate viscosity, and taking the appropriate amount to pour into the aluminum plate. The film is formed by curing in the nitrogen oven, and the curing temperature is raised in stages to obtain the sheet-shaped curable product of Comparative Example 2.

Evaluation Test Method

Dielectric analysis method: the dielectric constant ($D_k$) and the dissipation factor ($D_f$) of the curable product is tested at 10 GHz.

Glass transition temperature: using the differential scanning calorimetry (DSC) to measure the glass transition temperature of the curable product, and the condition of the differential scanning calorimetry is detecting at a heating rate of 10° C./min.

5% thermogravimetric loss temperature and Char yield: using the thermos-gravimetric analysis (TGA) to measure the 5% thermogravimetric loss temperature and Char yield of 800° C., and the condition of the thermos-gravimetric analysis is detecting at a heating rate of 10° C./min.

Example 1, Example 2, Comparative Example 1 and Comparative Example 2 are performed the aforementioned evaluation test method, and the results are recorded in Table 1.

TABLE 1

| | Example 1 | Example 2 | Comparative Example 1 | Comparative Example 2 |
|---|---|---|---|---|
| $D_k$ | 2.77 | 2.69 | 2.70 | 2.75 |
| $D_f$ | 0.0091 | 0.0067 | 0.0058 | 0.0060 |
| $T_g$ (° C.) | 178.7 | 186.9 | 163.2 | 171.6 |
| $T_{d5\%}$ (° C.) | 413.4 | 386.6 | 375.0 | 394.0 |
| Char yield (%) | 28.0 | 28.7 | 20.0 | 27.0 |

It can be seen from the results in Table 1, although the electrical performance of Example 1 cannot match that of Comparative Example 1 and Comparative Example 2, the heat resistance of Example 1 is greatly improved. However, the electrical performance of Example 2 is almost at the same level as that of Comparative Example 1 and Comparative Example 2, and the heat resistance of Example 2 is also greatly improved. The reason is presumably that the free volume of the modified group. The free volume of Synthesis Example 1 is small, resulting in the high crosslinking density to compress the electrical advantages of the dicyclopentadiene group, and Synthesis Example 2 is modified by using the 3-(methacryloxy)propyl group to adjust the curing crosslinking density successfully. Furthermore, the char yield of Example 1 and Example 2 is significantly improved compared to that of Comparative Example 1 and Comparative Example 2, representing that the thermal stability of Example 1 and Example 2 is better. In term of the balance between the performance and the price, the silicone-modified dicyclopentadiene-derived hydroxy aromatic compound of the present disclosure has great development potential when applied to the production of the high-frequency low-loss substrate.

In conclusion, the silicone-modified dicyclopentadiene-derived hydroxy aromatic compound of the present disclosure is dealcoholated and capped by the preferred siloxane compound and the addition of the catalyst, so as to achieve the process technology that can be used without purification. The high crosslinking density of the silicone-modified dicyclopentadiene-derived hydroxy aromatic compound can be used with the commercially modified polyphenylene oxide resin to create the more balanced formulation application value.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A silicone-modified dicyclopentadiene-derived hydroxy aromatic compound, comprising a structure represented by formula (I):

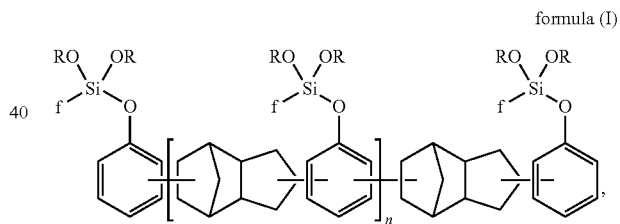

wherein R is a methyl group or an ethyl group, f is a vinyl group or a 3-(methacryloxy)propyl group, and n is an integer from 0 to 5.

2. A manufacturing method for a silicone-modified dicyclopentadiene-derived hydroxy aromatic compound, comprising:

performing a mixing step, wherein a dicyclopentadiene-derived hydroxy aromatic compound represented by formula (i) is mixed with an anhydrous solvent, and then heated to a first temperature to dissolve acceleratedly to obtain a first mixture:

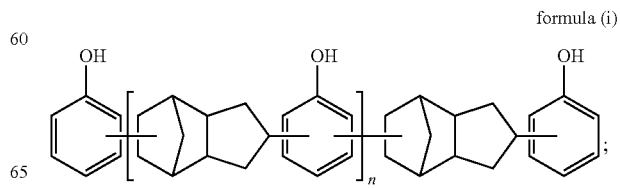

performing an adding step, wherein a catalyst is added to the first mixture to obtain a second mixture;

performing a dealcoholization step, wherein the second mixture is heated to a second temperature, a siloxane compound represented by formula (ii) is added to the second mixture, and an alcohol is distilled out to obtain a third mixture:

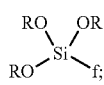

formula (ii)

and performing a filtering step, wherein the third mixture is cooled and filtered to obtain a silicone-modified dicyclopentadiene-derived hydroxy aromatic compound represented by formula (I):

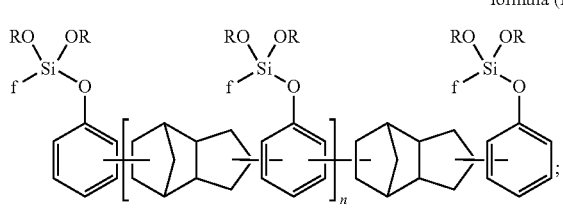

formula (I)

wherein R is a methyl group or an ethyl group, f is a vinyl group or a 3-(methacryloxy)propyl group, and n is an integer from 0 to 5.

3. The manufacturing method for the silicone-modified dicyclopentadiene-derived hydroxy aromatic compound of claim 2, wherein the anhydrous solvent is an aromatic.

4. The manufacturing method for the silicone-modified dicyclopentadiene-derived hydroxy aromatic compound of claim 2, wherein the first temperature is 80° C. to 110° C.

5. The manufacturing method for the silicone-modified dicyclopentadiene-derived hydroxy aromatic compound of claim 2, wherein the catalyst is an imidazole derivative, 1,8-diazabicyclo[5.4.0]undec-7-ene (DBU) derivative or 4-dimethylaminopyridine (DMAP) derivative.

6. The manufacturing method for the silicone-modified dicyclopentadiene-derived hydroxy aromatic compound of claim 2, wherein an addition amount of the catalyst is 200 ppm to 1000 ppm.

7. The manufacturing method for the silicone-modified dicyclopentadiene-derived hydroxy aromatic compound of claim 2, wherein the second temperature is 110° C. to 120° C.

8. A curable product, wherein the curable product is obtained by mixing the silicone-modified dicyclopentadiene-derived hydroxy aromatic compound of claim 1 and a modified polyphenylene oxide resin, and then adding a peroxide to perform a curing reaction.

9. The curable product of claim 8, wherein a solid content ratio of the silicone-modified dicyclopentadiene-derived hydroxy aromatic compound to the modified polyphenylene oxide resin is 20:80.

10. The curable product of claim 8, wherein the modified polyphenylene oxide resin is a methacrylate based modified polyphenylene oxide.

* * * * *